W. T. CHEISTIAN.
OIL BURNER ATTACHMENT FOR STOVES.
APPLICATION FILED JULY 6, 1909.
955,499.
Patented Apr. 19, 1910.
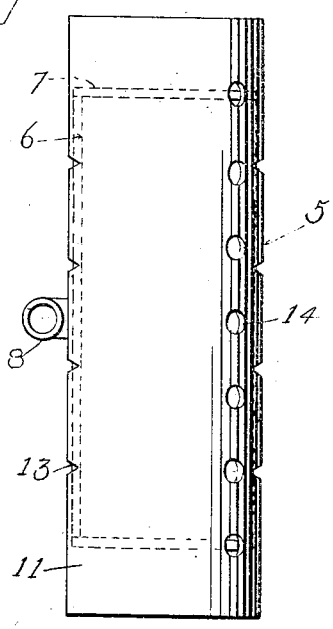
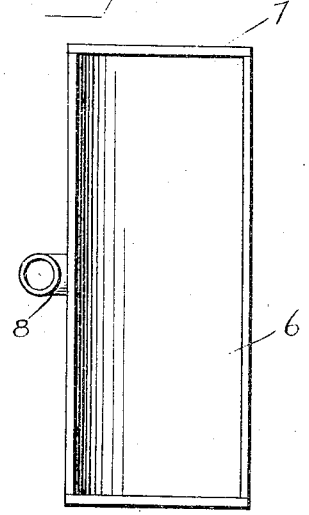
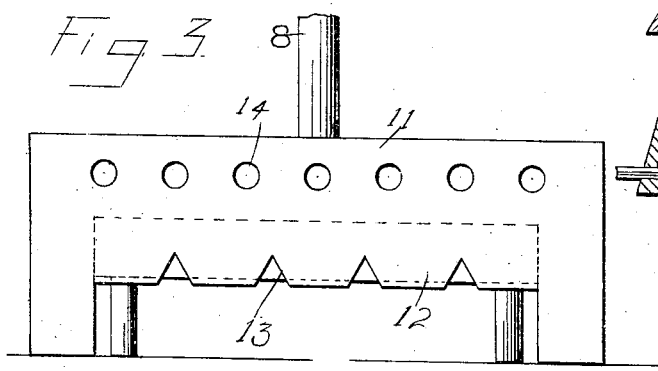
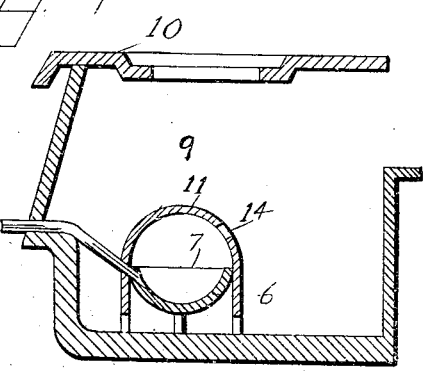
Witnesses
J. E. Strobel
F. O. Parker
Inventor
William T. Cheistian.
By Chandlee & Chandlee
Attorneys

UNITED STATES PATENT OFFICE.

WILLIAM T. CHRISTIAN, OF DALLAS, TEXAS.

OIL-BURNER ATTACHMENT FOR STOVES.

955,499.  Specification of Letters Patent.  Patented Apr. 19, 1910.

Application filed July 6, 1909. Serial No. 506,139.

*To all whom it may concern:*

Be it known that I, WILLIAM T. CHRISTIAN, a citizen of the United States, residing at Dallas, in the county of Dallas, State of Texas, have invented certain new and useful Improvements in Oil-Burner Attachments for Stoves; and I do hereby declare the following to be a full, clear, and exact description of the invention, such as will enable others skilled in the art to which it appertains to make and use the same.

The invention relates to burners and more particularly to the class of oil burners for heating or cooking stoves.

The primary object of the invention is the provision of a burner in which access is readily had to the interior of the same whereby it may be thoroughly cleaned or repaired when the occasion demands and that will furnish a substantial flame so as to possess high heating qualities with the minimized consumption of fuel when in operation.

Another object of the invention is the provision of a burner of this character which will burn crude or other oil and one that possesses few parts making it readily accessible and capable of being easily separated to allow cleaning thereof, the burner being simple in its construction, reliable and efficient in its operation and inexpensive in its manufacture.

With these and other objects in view, the invention consists in the construction, combination, and arrangement of parts as will be hereinafter more fully described, illustrated in the accompanying drawings, which disclose the preferred form of embodiment of the invention and as pointed out in the claim hereunto appended.

In the drawings:—Figure 1 is a top plan view of the burner. Fig. 2 is a top plan view of the pan of the burner with the hood removed. Fig. 3 is a side elevation of the burner. Fig. 4 is a fragmentary sectional elevation of the stove with the burner mounted therein the same being in section.

Similar reference characters indicate corresponding parts throughout the several views in the drawings.

In the drawings, the numeral 5 designates generally a burner comprising an elongated rectangular shaped casting forming an oil pan 6, the latter being in cross section throughout its length substantially semi-circular shaped and closed at opposite ends by vertical walls 7, so as to retain oil delivered thereinto. Integral with and rising centrally from one longitudinal edge of the oil pan 6, is an oil feed tube 8, which latter is adapted to be connected to any suitable source of oil supply so as to deliver oil into the oil pan. This oil pan is suitably mounted within the fire box 9 of a cooking or heating stove body 10, which latter may be of any well known construction.

Detachably mounted above the oil pan is an elongated arcuate shaped hood or cap 11, which latter is formed with depending spaced straight parallel sides 12, and this hood or cap 11 is of considerably greater length than the oil pan 6 and has opposite open ends to permit an unobstructed ingress of air and its circulation thereof between the said hood and oil pan when the burner is in operation.

Formed in the longitudinal edges of the side 12, of the hood are spaced inverted V-shaped notches 13, which latter extend beyond the plane of the pan 6, and provide air apertures for the burner. Contained at intervals throughout the length of the hood and near the top thereof are a plurality of alining flame orifices 14, to permit the ignition of the mixture of oil and air and when lighted there will be a uniform and constant flame issuing from the burner within the stove.

It will be obvious that the hood or cap 11, may be readily removed from the oil pan so that the latter may be cleaned and also the hood or pan to permit the proper working of the burner when in operation.

It is to be understood that the oil pan may be used independently of the hood.

What is claimed is:—

An attachment of the character described comprising a pan of semi-circular shape in cross section throughout its length, having closed ends, a hood fitted above the pan, the hood being of semi-circular shape with opposite open ends, the longitudinal edges of the hood containing inverted V-shaped notches, the said hood also being provided with a row of openings contiguous to one longitudinal edge thereof, and means for supplying oil to the pan.

In testimony whereof, I affix my signature, in presence of two witnesses.

WILLIAM T. CHEISTIAN.

Witnesses:
 ED BALL,
 BOB CLOUD.